United States Patent
Huth et al.

(10) Patent No.: US 10,075,294 B2
(45) Date of Patent: Sep. 11, 2018

(54) METHOD FOR GENERATING A SECRET SEQUENCE OF VALUES IN A DEVICE AS A FUNCTION OF MEASURED PHYSICAL PROPERTIES OF A TRANSMISSION CHANNEL

(71) Applicant: Robert Bosch GmbH, Stuttgart (DE)

(72) Inventors: Christopher Huth, Leonberg (DE); Rene Guillaume, Weil der Stadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 37 days.

(21) Appl. No.: 15/353,043

(22) Filed: Nov. 16, 2016

(65) Prior Publication Data
US 2017/0170959 A1    Jun. 15, 2017

(30) Foreign Application Priority Data
Dec. 15, 2015    (DE) ........................ 10 2015 225 222

(51) Int. Cl.
*H04L 29/06*    (2006.01)
*H04L 9/08*    (2006.01)

(52) U.S. Cl.
CPC .................................. *H04L 9/0875* (2013.01)

(58) Field of Classification Search
None
See application file for complete search history.

(56) References Cited

U.S. PATENT DOCUMENTS

| | | | |
|---|---|---|---|
| 2003/0124977 A1* | 7/2003 | Smith | H04W 88/04 455/16 |
| 2006/0052727 A1* | 3/2006 | Palestrant | A61B 5/1118 600/595 |
| 2012/0133511 A1* | 5/2012 | Blum | G08B 13/06 340/541 |
| 2014/0176329 A1* | 6/2014 | Kim | A61B 5/746 340/539.13 |

FOREIGN PATENT DOCUMENTS

| | | |
|---|---|---|
| DE | 102012215326 A1 | 3/2014 |
| WO | 1996023376 A2 | 8/1996 |
| WO | 2006081122 A2 | 8/2006 |

* cited by examiner

*Primary Examiner* — David Le
(74) *Attorney, Agent, or Firm* — Norton Rose Fulbright US LLP; Gerard Messina

(57) ABSTRACT

A method is described for generating a secret sequence of values in a first device as a function of measured physical properties of a transmission channel between the first device and at least one second device. In this context, movements are detected by at least one sensor, and as a function of the detected movements, it is determined whether values of the physical properties of the transmission channel measured during the detected movements are suitable for generating the secret sequence of values.

19 Claims, 3 Drawing Sheets

METHOD FOR GENERATING A SECRET SEQUENCE OF VALUES IN A DEVICE AS A FUNCTION OF MEASURED PHYSICAL PROPERTIES OF A TRANSMISSION CHANNEL

CROSS REFERENCE

The present application claims the benefit under 35 U.S.C. § 119 of German Patent Application No. DE 102015225222.1 filed on Dec. 15, 2015, which is expressly incorporated herein by reference in its entirety.

FIELD

The present invention relates to methods for generating a secret sequence of values in a device as a function of measured physical properties of a transmission channel, as well as computer programs and devices that are equipped to carry out such methods.

BACKGROUND INFORMATION

In order to protect communication in networks, usually suitable cryptographic methods are used, which in general may be subdivided into two different categories: Symmetrical methods, in which transmitter and receiver possess the same encryption key, as well as asymmetrical methods in which the transmitter encrypts the data to be transmitted using a public key of the receiver (that is, a key also possibly known to a potential attacker), the decryption, however, only being able to be carried out with an associated private key that ideally is known only to the legitimate receiver.

Asymmetrical methods have the disadvantage, inter alia, that as a rule, they feature very high computing complexity. Consequently, they are only conditionally suitable for resource-limited nodes like, for example, sensors, actuators or others that usually possess only relatively small computing power as well as little memory, and are intended to operate energy-efficiently, e.g., on the basis of battery operation or the use of energy harvesting. Moreover, often only a limited bandwidth is available for transmitting data, which makes the exchange of asymmetrical keys with lengths of 2048 bits or even more unattractive.

When using symmetrical methods, on the other hand, it must be ensured that both the receiver and the transmitter possess the same key. In this case, generally the associated key management represents a very demanding task. In the realm of mobile radiocommunications, for example, keys are introduced into a mobile telephone with the aid of SIM cards, and the associated network is then able to assign the appropriate key to the unique identification of an SIM card. In the case of wireless LANs, on the other hand, usually the keys to be used are input manually ("pre-shared keys", established as a rule by the input of a password) upon setting up a network. However, such a key management quickly becomes very costly and impracticable if one has a very large number of nodes, e.g., in a sensor network or other machine-to-machine communication systems. In addition, a change of the keys to be used is often not possible at all or only with great expenditure.

That is why, for some time, innovative approaches are in the process of being tested and developed under the catchphrase "physical layer security", with whose aid keys for symmetrical methods are able to be generated automatically on the basis of the transmission channels between the nodes involved. The ascertainment of random numbers or pseudo-random numbers from channel parameters is described, for example, in PCT Application No. WO 1996023376 A2, and the generation of secret keys is described, for example, in PCT Application No. WO 2006081122 A2 and German Patent Application No. DE 102012215326 A1.

Typically, the initial bit sequences derived from the transmission-channel properties in the devices involved are (strongly) correlated, but not identical. However, since symmetrical cryptography requires identical keys, a key-matching process is necessary. In this process, information about the quantized bit sequences may be exchanged and reconciled, in doing which, the intention being to disclose as little as possible about the sequences and the keys to be derived from them to potential attackers that could be listening surreptitiously to the communication exchanged. Two approaches for this are the use of a CASCADE protocol or the use of error correction codes.

SUMMARY

The present invention relates to methods, as well as devices which are equipped to carry out one of the methods. In addition, the present invention relates to a computer program that is equipped to carry out one of the methods.

In this context, two devices are assumed, that are connected to each other and are able to exchange data. In the devices, values may be derived from properties of the (especially wireless) transmission channel between them, and a bit sequence may be ascertained from the values. In particular, this bit sequence, as shared secret, may be the basis of a key for an encrypted communication between the devices.

In accordance with the present invention, the methods are made more secure with the assistance of sensors. As a function of the detection and evaluation of movement data which has an influence on the measured channel properties, measurements unsuitable for generating the key or secret may be discarded. The example methods in accordance with the present invention for the secret generation or key generation are therefore more robust vis-à-vis manipulations, especially active attacks. However, measured values that are otherwise unsuitable, primarily measured values having insufficient randomness, may also be recognized and discarded. For example, such measured values may occur in the case of repetitious or foreseeable movement patterns.

Movements which may have an influence on the channel properties are taken into account. Preferably, they are movements of the participant devices themselves or movements in their vicinity.

BRIEF DESCRIPTION OF THE DRAWINGS

The present invention is described in greater detail below based of exemplary embodiments and with reference to the figures.

DETAILED DESCRIPTION OF EXAMPLE EMBODIMENTS

Figure 1:
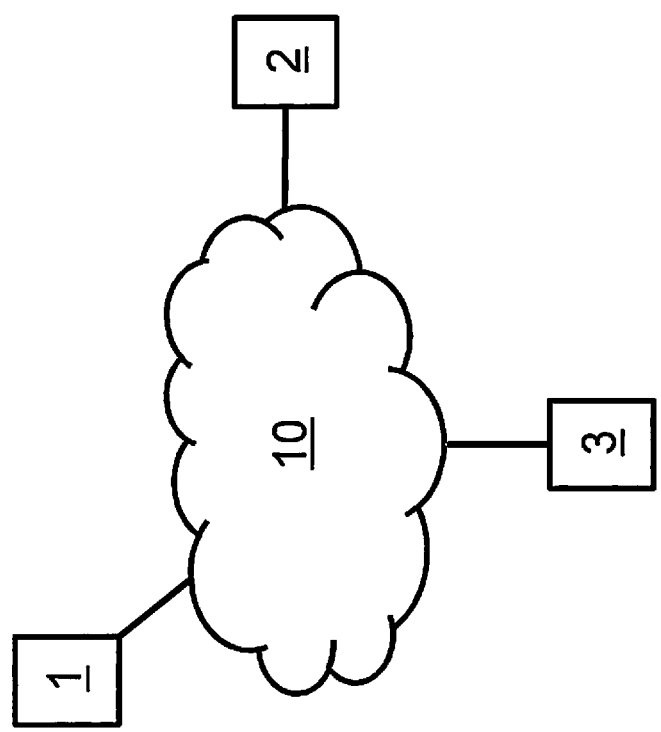
FIG. 1 shows schematically the physical layout of an exemplary underlying communication system.

In the following, a setup is discussed, as illustrated abstractly in FIG. 1. In this context, various users 1, 2 and 3 are able to communicate with each other via what is referred to as a shared medium 10. Let us now say that users 1, 2 and 3 are typical devices having communication means, which are disposed as communication nodes in a communication network such as a wireless network (Wireless Sensor Network WSN, Wireless Body Area Network WBAN, etc.), for example.

Figure 2:
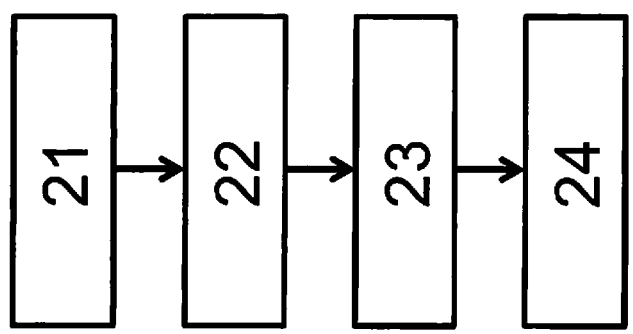
FIG. 2 shows the sequence of an exemplary method for deriving a shared secret between two network users.

At least two of the users now want to extract a shared secret from properties of a shared (especially wireless) communication channel using the methods of what is referred to as physical-layer-based key generation. An exemplary sequence of such a method is illustrated schematically in FIG. 2. The method includes the four blocks of channel measurement (step 21), quantization (step 22), information reconciliation (step 23) and privacy amplification (step 24). In variants, further optional blocks of signal processing and additional computation steps may be added.

The methods considered are suited for the automatic generation of shared secrets, particularly symmetrical cryptographic keys, based on properties of physical channels between devices with a wireless or wire-bound communications link, e.g., between users of a network. Consequently, symmetrical encryption methods may be used, without great expenditure, to realize various security goals, which is of particular interest for practical applications in the realm of machine-to-machine communication, thus, for example, for transmitting data between various sensor nodes and/or actuator nodes.

In the process, the reciprocity and the inherent randomness of the transmission channels between the devices are utilized. In detail, this may proceed, for example, as described in the following. Two devices assess a certain number of channel parameters, perhaps also over time. Possible properties of the transmission channel which may be utilized for this include, inter alia, amplitude properties of the transmission, phase properties of the transmission, as well as combinations thereof. Thus, for example, phase shifts caused by the transmission channel, transmission losses, as well as variables derived therefrom are possible as channel parameters. For instance, the Received Signal Strength Indicator (RSSI) represents a common indicator for the receive field strength of wireless communication applications, and may be utilized for these purposes. To determine the channel parameters, pilot signal sequences, or rather experimental or test data, which are known to both sides and facilitate the necessary channel assessments, may be transmitted between the nodes.

In the methods described, it is assumed that a potential attacker is at sufficiently great distance from the two devices in which the symmetrical key is to be generated. In this context, the distance should lie at least on the order of magnitude of what is referred to as the coherence distance or so-called coherence space, which, for example, in the case of customary wireless communication systems, lies in the range of a few centimeters. Consequently, in each case the attacker sees other (independent) transmission channels with respect to these two devices, and cannot readily reconstruct the same key.

In addition, it is assumed that the transmission channels between the nodes exhibit sufficient fluctuations of their channel properties, so as to be able to derive suitable channel parameters from them that are suited as basis for generating a key in the user, especially that they have sufficient random properties. In particular, these fluctuations may occur both in the time domain and in the frequency domain, as well as in the spatial domain in the case of multi-antenna systems. However, it is also assumed that over brief time spans, the channel properties exhibit a correlation which is high enough that data may be transmitted in both directions, from which, in spite of the time difference, the respective nodes are able to assess channel properties sufficiently alike to obtain adequately similar channel parameters, from which identical keys may be obtained.

The channel parameters ascertained are quantized in suitable manner by both devices. Preferably, measures then follow for reducing noise and errors, e.g., by the use of error-correcting codes. With the aid of suitable mechanisms, the quantized channel parameters are then reconciled between the devices (also known as key alignment or information reconciliation), preferably with the use of a public protocol. This is necessary in many application cases, since because of measuring inaccuracies, noise, interferences, etc., in general, initially both devices have not ascertained any identical sets of parameters. In this context, the reconciliation should be such that a potential attacker that may listen in on the exchanged data is unable to readily extrapolate the quantized channel parameters from it. To that end, for example, parity bits could be exchanged between the devices.

Finally, calculations which increase the confidentiality of the derived secret (privacy amplification) may be provided in the devices.

The channel-based key-generating methods described may be made sufficiently secure vis-à-vis a passive, merely listening attacker. An active attacker, on the other hand, could find ways to successfully attack the system, e.g., by manipulating the communication channel, and could therefore acquire secret information. Such attacks are difficult to carry out in environments with strong scattering.

In the case of fading effects, it is possible to differentiate between "small-scale" and "large-scale" fading effects. The latter come about, for example, in response to shadowing by large buildings, and are thereby less location-dependent than small-scale fading effects. These change over short distances, e.g., due to changing constructive/destructive interference of superimposing multipath propagations.

However, for channels having dominant line-of-sight (LOS) components, as well as in the case of channel metrics that are characterized by path losses and large-scale fading effects, crucial channel properties such as the received signal strength indicator (RSSI), for instance, are easier to manipulate. For example, an attacker could alternately block and unblock the line of sight according to a specific pattern, and therefore acquire information via the resultant time sequence of minima and maxima in the measurements of the RSSI.

Although adjustments of the system parameters to instantaneous channel statistics may be provided in the methods described, they are only conditionally effective in the face of such attacks. It is therefore proposed to call upon independent external references in order to check and confirm the measured values of the physical parameters, in particular, to detect such manipulations (but also other scenarios critical with regard to security) with the aid of sensors, and to repel them.

Also, movements are detected with the aid of suitable sensors and, as a function of the detected movements, to determine whether the measured values of the physical properties of the transmission channel are suitable for a secure and secret key generation or secret generation. This determination is based on the principle that (stronger) movements of the participant devices or in the area surrounding the participant devices should have a noticeable influence on the measured values of the physical properties of the channel between the devices. For example, acceleration sensors, gyroscopes, magnetometers or yaw-rate sensors are possible as sensors for this purpose. However, microphones (via windage noise in response to movement), photodiodes (via light fluctuations) or sensors for (relative or absolute) position finding (e.g., in radio-based or light-based communication systems) may also be used.

Figure 3:
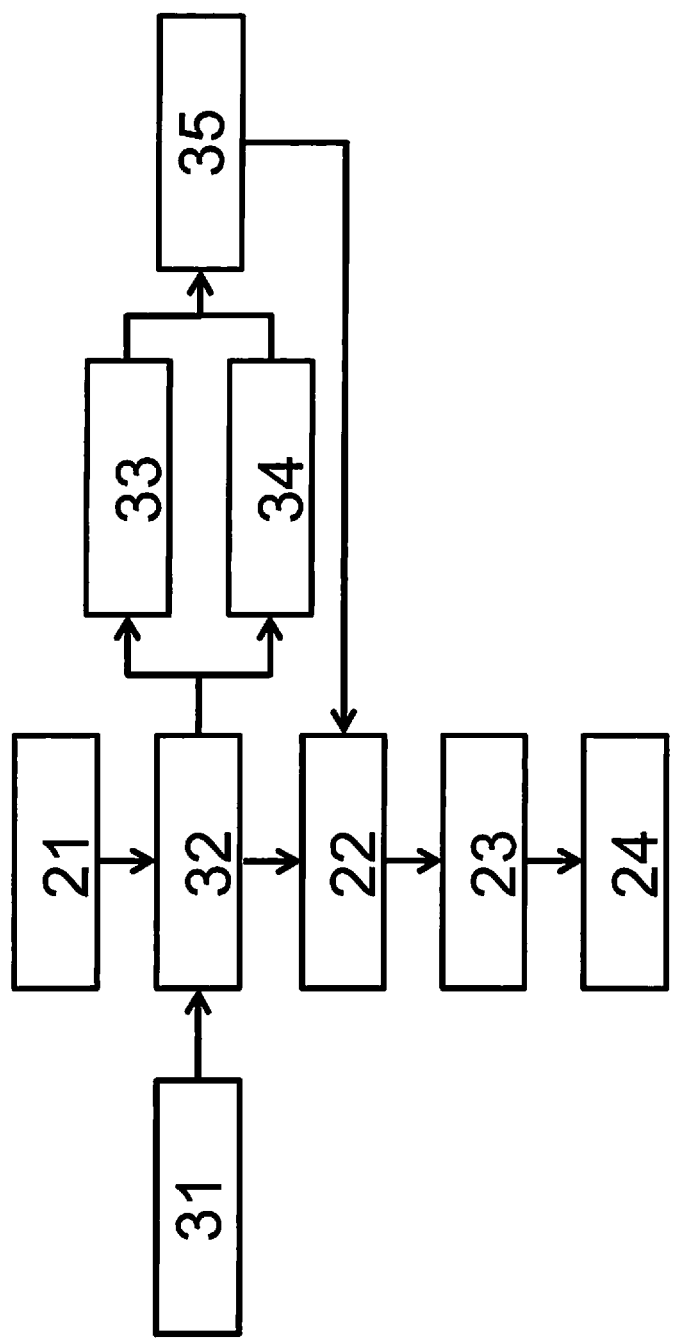
FIG. 3 shows a supplemented sequence of an exemplary method for deriving a shared secret between two network users.

One aim of the movement detection is to identify suspicious patterns that could have been caused by an active attacker, and to initiate suitable countermeasures. For example, this may be carried out as shown in FIG. 3.

During the channel assessment or measurement of values of a physical property of the transmission channel in step 21, movement is detected with the assistance of sensors in step 31. In step 32, an evaluation is carried out, which identifies anomalies on the basis of the sensor data or its characteristic curve and the measured values or their characteristic curve. This may be accomplished by comparing the curves, especially determining correlations between the curves. In step 33, a plausibility check is carried out, especially as to whether the measured values are plausible in light of the detected movements.

If the sensors detect movements which, because of their type or magnitude, should have a noticeable influence on the channel properties, as a plausibility check, it may be checked whether corresponding properties are observable in the measured values of the channel properties. The underlying idea is that movement, primarily of the participant devices themselves, increases the variance and (depending on the speed of the movement) the rate of change of the channel properties of a multipath propagation. For example, a repeating movement of one of the devices should lead to changes or patterns likewise repeating in the measured channel properties. If this is not the case or if the patterns or changes recognized in the measured channel properties deviate more than pre-determined from what is expected, then a manipulation may exist and the measured values may be judged to be invalid or insufficiently suitable for generating a secret. Concurrently with that, in step 34, a pattern recognition may be carried out. In doing this, for example, a non-random pattern may be recognized in the measured values, and it may be checked whether this can be explained by the movements likewise detected. If the sensor data or the channel measurements contain significant patterns which are not to be anticipated in scenarios without manipulation, a manipulation or at least insufficient suitability of the measurements may likewise be inferred. For example, temperature changes, produced by attackers, which influence the hardware properties of the participant devices, or perhaps the manipulation of the transmission channel with objects, e.g., metal plates, are possible as manipulation. In order to recognize such manipulations, the devices may also resort to reference measurements. The pattern recognition may be carried out using familiar pattern-recognition methods or signal-component analyses. Established tests for randomness of data are also suited to identify statistical defects.

Alternatively, in steps 32-34, it is also possible to check for suspicious or unwanted sequences of movements. In this case, primarily repetitive and non-random sequences of movements are unwanted, since they may be reflected in the measured values and therefore may reduce the randomness of the bit sequences derived from them.

In particular, in this context, effects may be detected that trace back to repetitive or predictable movements which were generated by a user. Such pseudo-random changes of the channel properties are able to be differentiated from genuine random changes owing to multipath propagation. Depending on the sensors, speed and direction of movements may be identified, and therefore the quality of the movement may be evaluated. Repeating patterns with low entropy in particular are counted as poor movement patterns.

In many cases (for example, when working with a fixed sampling rate in the case of channel measurements), it may be difficult to distinguish between reciprocal channel measurements of high randomness and a static channel in which changes trace back largely to non-reciprocal noise. This differentiation could be assisted with the aid of sensor data for the detection and classification of movements. If a sequence looks like a random sequence, but the sensors have not registered a corresponding adequate movement, then it is highly likely that the scenario is static. In this case, it is highly probable that an information reconciliation would be unsuccessful, and unnecessary resources would have to be expended for it. This may be avoided if the process for generating a secret is aborted in such cases.

Steps 32 through 34 and their sequence are described here only by way of example. If suspicious implausibilities or deviations between the detected movements and the measured values, or unwanted sequences of movements are detected in steps 32 through 34, then a countermeasure is initiated in step 35.

If, during the detection of anomalies, etc., in steps 32-34, the method was already pursued with the quantization of step 22, then, for example, a countermeasure may be a termination of this step. Alternatively and additionally, the device processing unit which performs the check test may generate and transmit an error message or a warning. Further consequences may include that only the values which were measured during suspicious or unwanted movements are not utilized for generating the secret sequence of values. To that end, such values are discarded and only the remaining values are further processed. Alternatively, in the case of suspicion or error, the entire generation of a secret sequence of values may likewise be aborted. If an active attack is suspected, then further suitable security measures may be initiated. By pattern recognition and the comparison to reference data, it may be possible not only to detect attacks, but also to classify attacks. Depending on the class of the suspected attack, a countermeasure suitable for it may then be initiated.

If the check of the measured values and the detected movements yields no indication of a manipulation, or if at least sufficiently suitable values are available, then in steps 22, 23 and 24, the measures of quantization, information reconciliation and privacy amplification already described above are carried out to conclude the secret-generating process.

The methods described here for generating symmetrical keys to protect the communication between at least two devices may be used in a multitude of wireless, wire-bound and other communication systems. In this context, the approach described is of special interest for machine-to-machine communication, thus, for the transmission of data between different sensors, actuators, etc., which generally have only very limited resources and possibly cannot be configured manually in the field at reasonable cost. For example, practical applications include home and building automation, telemedicine, car-to-X systems or industrial automation.

Usage in the case of future miniature sensors having air interfaces is also of special interest.

What is claimed is:

1. A method for generating a secret sequence of values in a first device, the method comprising:
measuring, via at least one sensor, physical properties of a transmission channel between the first device and at least one second device, wherein the devices are communication devices disposed as communication nodes in a communications network;
detecting, via a processor, movements by at least one sensor; and
determining, via the processor, as a function of the detected movements, whether values of the physical properties of the transmission channel measured during the detected movements are plausible and therefore suitable for generating the secret sequence of values;
if the values are not plausible, performing a countermeasure, including at least one of terminating the determining, generating an error message and/or a warning, and/or excluding values unplausible values from the generating of the secret sequence of values; and
if the values are plausible, generating the secret sequence of values to provide symmetrical keys to protect communication among the devices.

2. The method as recited in claim 1, wherein the measured values of the physical properties are determined to be unsuitable if non-random or predictable or repetitive movement patterns are recognized in the detected movements.

3. The method as recited claim 1, wherein the measured values of the physical properties are determined to be unsuitable if the detected movements are weaker than a predetermined threshold.

4. The method as recited in claim 1, wherein the measured values of the physical properties are determined to be unsuitable if there is not a sufficiently strong correlation between the detected movements and the measured values of the physical properties.

5. The method as recited in claim 1, wherein the measured values of the physical properties are determined to be unsuitable if non-random patterns, which cannot be traced back to the detected movements, are recognized in the measured values of the physical properties.

6. The method as recited in claim 1, wherein the detecting includes detecting movements of at least one of the first device and of the second device.

7. The method as recited in claim 1, wherein the detecting includes detecting movements of the first device relative to the second device.

8. The method as recited in claim 1, wherein the detecting includes detecting movements of other objects one of: i) in an area surrounding the first device, ii) in an area surrounding the second device, or iii) in an area surrounding the transmission channel between the first device and the second device.

9. The method as recited in claim 1, wherein the suitability is determined as a function of a strength of the movements.

10. The method as recited in claim 1, wherein the suitability is determined as a function of a speed or acceleration or frequency or direction of the movements.

11. The method as recited in claim 1, wherein the first device determines whether the measured values are suitable, and the first device transmits a message to the second device or to a further external unit if the measured physical properties are not suitable.

12. The method as recited in claim 1, wherein unsuitable measured values are not utilized for generating the secret sequence of values.

13. The method as recited in claim 1, wherein no secret sequence of values is generated if at least a portion of the measured values is not suitable for generating the secret sequence of values.

14. The method as recited in claim 1, wherein an attack on the secret sequence of values to be generated is recognized on the basis of the detected movements.

15. The method as recited in claim 14, wherein the attack is classified on the basis of the detected movements, and suitable countermeasures are initiated as a function of the classification.

16. The method as recited in claim 1, wherein the at least one sensor includes an acceleration sensor, a gyroscope or a magnetometer.

17. The method as recited in claim 1, wherein the at least one sensor is mounted in or on the first or the second device.

18. An apparatus for generating a secret sequence of values in a first device, comprising:
a processing unit configured to perform the following:
measuring, via at least one sensor, physical properties of a transmission channel between the first device and at least one second device, wherein the devices are communication devices disposed as communication nodes in a communications network;
detecting, via a processor, movements by at least one sensor; and
determining, via the processor, as a function of the detected movements, whether values of the physical properties of the transmission channel measured during the detected movements are plausible and therefore suitable for generating the secret sequence of values;
if the values are not plausible, performing a countermeasure, including at least one of terminating the determining, generating an error message and/or a warning, and/or excluding values unplausible values from the generating of the secret sequence of values; and
if the values are plausible, generating the secret sequence of values to provide symmetrical keys to protect communication among the devices.

19. A non-transitory machine-readable storage medium on which is stored a computer program, which is executable by a processor, comprising:
a program code arrangement having program code for generating a secret sequence of values in a first device, by causing the processor to perform the following:
measuring, via at least one sensor, physical properties of a transmission channel between the first device and at least one second device, wherein the devices are communication devices disposed as communication nodes in a communications network;
detecting, via the processor, movements by at least one sensor; and
determining, via the processor, as a function of the detected movements, whether values of the physical properties of the transmission channel measured during the detected movements are plausible and therefore suitable for generating the secret sequence of values;
if the values are not plausible, performing a countermeasure, including at least one of terminating the determining, generating an error message and/or a warning, and/or excluding values unplausible values from the generating of the secret sequence of values; and
if the values are plausible, generating the secret sequence of values to provide symmetrical keys to protect communication among the devices.

* * * * *